United States Patent [19]

Harris

[11] Patent Number: 5,571,999

[45] Date of Patent: Nov. 5, 1996

[54] MULTI-POSITION ELECTRICAL SWITCH

[75] Inventor: Timothy S. Harris, Fort Wayne, Ind.

[73] Assignee: Mattel, Inc., El Segundo, Calif.

[21] Appl. No.: 345,484

[22] Filed: Nov. 28, 1994

[51] Int. Cl.$^6$ .................................................. H01H 19/46
[52] U.S. Cl. .............................. 200/565; 200/14; 200/571
[58] Field of Search .................................. 200/11 R, 14, 200/11 A, 570, 572, 571, 564, 252, 336, 277, 277.2, 565; 318/49, 50, 75, 83, 295, 432, 139; 446/443, 454, 462; 388/827, 851, 907.2, 930; 180/414, 65.1, 65.8; 280/DIG. 5

[56] References Cited

U.S. PATENT DOCUMENTS

| | | | |
|---|---|---|---|
| 3,493,696 | 2/1970 | Rothweiler | 200/4 |
| 3,818,293 | 6/1974 | Wood et al. | 318/139 |
| 3,996,440 | 12/1976 | Niconienko | 200/277 X |
| 4,246,453 | 1/1981 | Marchese et al. | 200/11 R |
| 4,378,855 | 4/1983 | Haub et al. | 180/65 R |
| 4,401,866 | 8/1983 | Kaminski et al. | 200/61.88 |
| 4,562,893 | 1/1986 | Cunard | 180/6.5 |
| 4,572,931 | 2/1986 | Shiraishi et al. | 200/11 DA |
| 4,625,084 | 11/1986 | Fowler et al. | 200/11 DA |
| 4,639,646 | 1/1987 | Harris et al. | 318/139 |
| 4,916,263 | 4/1990 | Ichigo | 200/11 R |
| 4,959,554 | 9/1990 | Underwood, IV et al. | 307/38 |
| 5,173,591 | 12/1992 | Perego | 200/61.88 |

FOREIGN PATENT DOCUMENTS

| | | |
|---|---|---|
| 0447262A1 | 9/1991 | European Pat. Off. . |
| 9315926 | 9/1993 | WIPO ............................ 180/65.1 |

*Primary Examiner*—Renee S. Luebke
*Attorney, Agent, or Firm*—Kolisch, Hartwell, Dickinson, McCormack & Heuser

[57] ABSTRACT

A multi-positional electrical switch is provided for use in a child's riding toy wherein a power source is connected to a plurality of motors in selected alternative configurations so as to impart varying rotational motion to the toy's driven wheels. The switch includes a stationary base with a plurality of stationary contacts, and a manually operable selector mechanism which carries an arrangement of electrically conductive bridges capable of variously connecting the contacts of the base plate. Each such contact is electrically connected to a predetermined terminal of the motors and power source so as to provide electrical input and output to each motor through the switch. The bridges move unitarily with the selector mechanism, alternatively placing the toy's drive system in a high-speed forward configuration, a low-speed forward configuration or a low-speed reverse configuration.

10 Claims, 3 Drawing Sheets

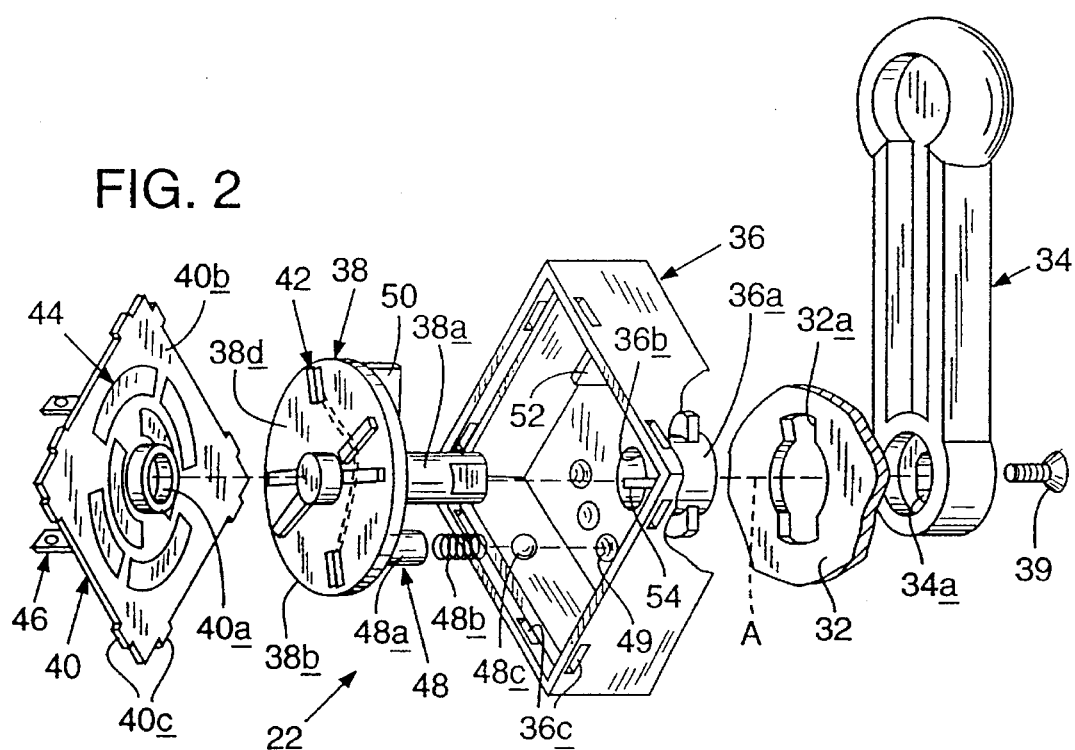
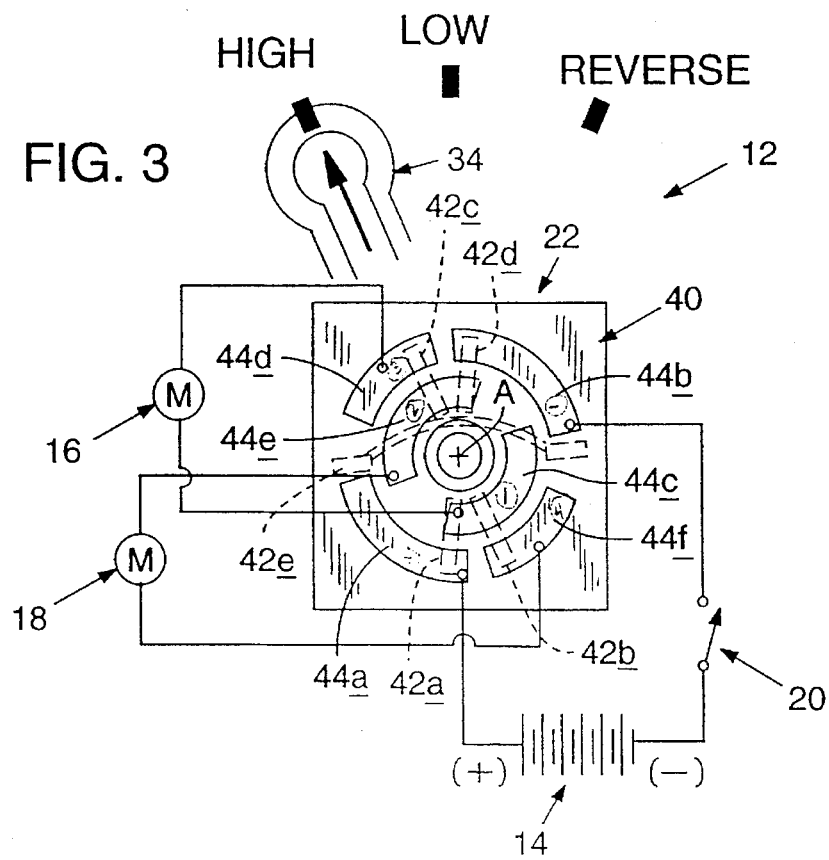

MULTI-POSITION ELECTRICAL SWITCH

TECHNICAL FIELD

The present invention relates generally to electrical switching mechanisms, and more particularly, to a multi-position electrical switch which connects a power source to a plurality of electrical load elements in selected alternative configurations. Although the invention has broad utility, it has proven particularly well suited for use as an electrical gear shift mechanism in a child's riding toy, and is described in that context below.

BACKGROUND ART

Over the years, a number of toy vehicles have been developed to propel a small child across the floor or ground under electric power. Such vehicles employ various drive systems, the simplest of which consists of a battery, an on-off switch, and a single direct-current drive motor for turning one of the vehicle's wheels. In such a system, the vehicle operates only at a single speed, and only in a forward direction. More complex drive systems offer multiple (or variable) speeds, operate more than one wheel, and may offer both forward and reverse drive. An example of such a system is found in U.S. Pat. No. 4,639,646, which describes a two pedal, three-way control for a child's riding toy. The disclosure of that patent is incorporated herein by this reference.

The drive system described in U.S. Pat. No. 4,639,646 includes two rechargeable batteries, two drive motors (one on each rear drive wheel), an on-off switch, and a forward-reverse selector switch. Two-speed operation is provided by selectively connecting the two batteries in either series or parallel configuration. In series, the batteries supply "full" voltage to the drive system, resulting in "high" speed operation. In parallel, the batteries supply "half" voltage to the drive system, resulting in "low" speed operation. The system thus provides an effective way of producing multiple speeds in a toy vehicle without the use of energy-wasting variable resistors or expensive pulse-width-modulation speed control.

One disadvantage of the aforementioned drive system, however, is the need to carry two batteries on the vehicle in order to provide two-speed operation. Another problem relates to the complex electrical wiring arrangement which has heretofore been employed in order to provide reversible, two-speed operation. The latter problem is particularly troublesome in view of the multiple switches required where reverse operation of the vehicle is to be limited to low speed.

It would be desirable to provide an electrical drive system for a child's riding toy which uses a single battery, but which allows for two-speed operation of the vehicle by selecting between alternative wiring configurations of other discrete elements of the drive system, namely, the drive motors. A single battery, it will be appreciated, is less expensive to produce and replace than are multiple batteries, and requires less wiring to connect.

To further reduce wiring, it would be desirable to provide a multi-position electrical switch capable of independently connecting a power source to a plurality of motors in selected alternative configurations. Specifically, it would be advantageous to provide a single multi-position electrical switch capable of: connecting the motors in parallel across the power source in a forward polarity arrangement; connecting the motors in series across the power source in a forward polarity arrangement; and connecting the motors in series across the power source in a reverse polarity arrangement.

Furthermore, it would desirable to provide a multi-position switch in the form of a shift lever capable of placing the toy in either a high-speed forward, low-speed forward, or low-speed reverse configuration. Such switch would most beneficially be arranged to provide for direct connection to the power source and drive motors, with reconfiguration of the circuit being accomplished internally of the switch.

SUMMARY OF THE INVENTION

Accordingly, a multi-positional electrical switch is provided for use in a child's riding toy wherein a power source is connected to a plurality of motors in selected alternative configurations so as to impart varying rotational motion to the toy's driven wheels. Toward this end, the switch includes a stationary base plate with a plurality of stationary contacts, and a manually operable selector mechanism which carries an arrangement of electrically conductive bridges. Each contact on the base plate is independently electrically connected to a predetermined terminal of the motors and power source so as to provide electrical input and output to each motor through the switch. The conductive bridges move unitarily with the selector mechanism, the bridges and stationary contacts being positioned such that the motors may be configured: (1) in parallel with the power source in a first polarity arrangement; (2) in series with the power source in the first polarity arrangement; and (3) in series with the power source in a second polarity arrangement opposite the first polarity arrangement. Alternatively stated, the switch is capable of placing the toy's drive system in a high-speed forward configuration, a low-speed forward configuration or a low-speed reverse configuration. This is accomplished by arrangement of the stationary contacts in a plurality of concentric arrays, the bridges rotating upon operation of the selector mechanism so as to span selected ones of the stationary contacts, and thus variously configure the electrical connections therebetween.

BRIEF DESCRIPTION OF THE DRAWINGS

FIG. 2 is an unfolded, exploded isometric view of a multi-position electrical switch constructed in accordance with a preferred embodiment of the present invention.

FIG. 3 is a schematic representation of a drive system employing the switch of FIG. 2, the switch being configured to place the system in a high-speed forward configuration.

DETAILED DESCRIPTION OF THE PREFERRED EMBODIMENT AND BEST MODE FOR CARRYING OUT THE INVENTION

Figure 1:
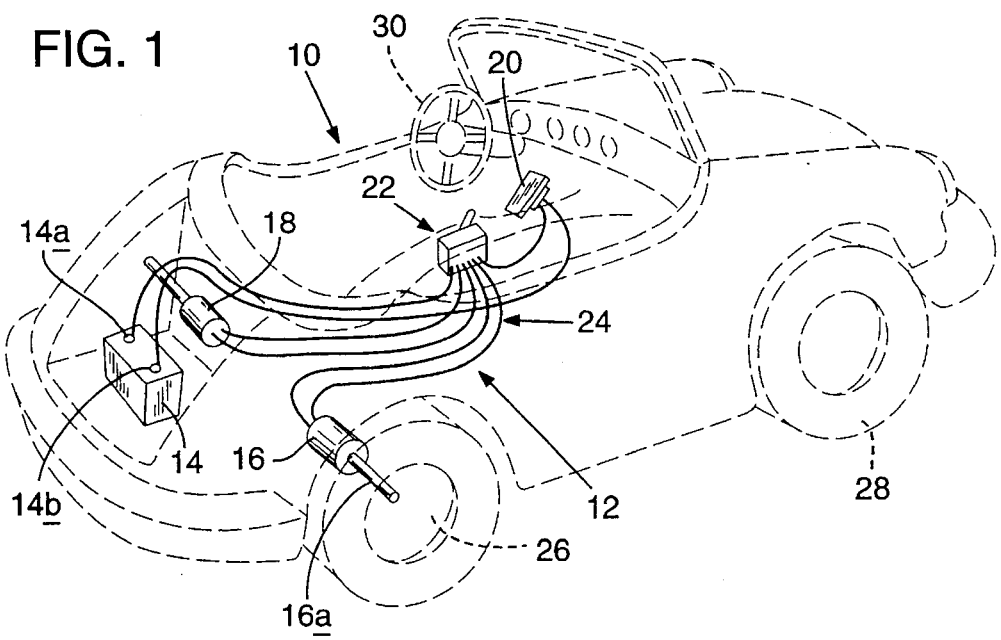
FIG. 1 is a somewhat schematic, isometric view of a child's riding toy (shown in phantom) which employs a drive system (shown in solid lines) including the electrical switch of the present invention.

Referring initially to FIG. 1, a child's battery-powered riding toy has been depicted in phantom, and is indicated generally at 10. Certain parts of the vehicle, such as the seats, trunk, battery housing and other accessories, are unnecessary to the explanation of the present invention and have been deleted from the phantom image so as to more clearly show the elements of the vehicle's drive system 12.

The drive system, it will be noted, includes the vehicle's battery power supply 14, a pair of reversible direct current (DC) drive motors 16, 18, an on-off switch in the form of a simulated gas pedal 20, and a multi-position shift mechanism 22 which defines the circuit connecting the motors and power supply. A wiring harness 24 connects the power supply and drive motors to the shift lever in a manner which will be described in detail below. Numerous other devices (not shown) may similarly be connected to the power supply through the wiring harness, including headlights, a horn, or other accessories.

As should be apparent, vehicle 10 is an electric vehicle designed to be ridden by one or two children, the vehicle having four wheels, only two of which are shown in the phantom image of FIG. 1. That image illustrates the right side of the vehicle, the vehicle's left side being a mirror image thereof.

In the depicted embodiment, right-side rear wheel 26 is a driven wheel, such wheel being rotationally driven by drive motor 16. The mechanical connection between the right drive motor 16 and rear wheel 26 is shown in FIG. 1 as a connecting shaft 16a between the motor and the wheel hub. Those skilled will appreciate, however, that motor 16 could be mechanically coupled to driven wheel 26 by another type of suitable mechanical linkage, such as a belt or chain transmission, or the like. The left-side rear wheel (not shown), on the opposite side of the vehicle from wheel 26, is rotatably driven by left drive motor 18 in a manner similar to that just-described.

Figure 4:
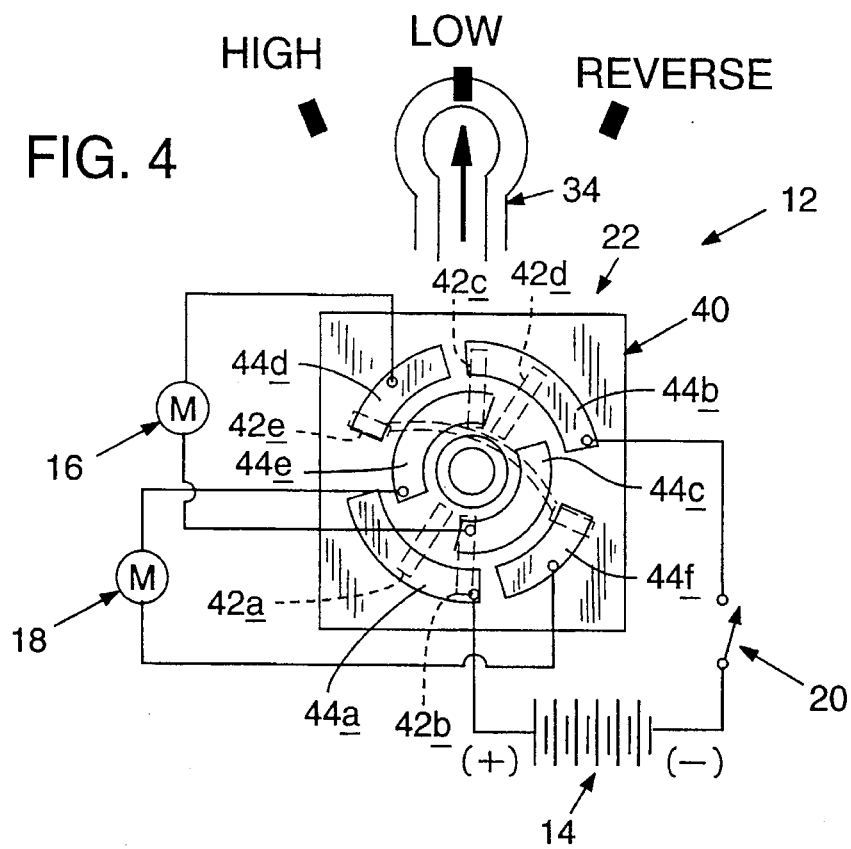
FIG. 4 is a schematic representation of a drive system similar to that of FIG. 3, but with the switch configured so as to place the system in a low-speed forward configuration.

The front wheels of the vehicle are not coupled to drive motors and are referred to herein as non-driven wheels. The right-side non-driven wheel 28 is visible in FIG. 1. An identical left-side non-driven wheel (not shown) is provided on the left side of the vehicle. The non-driven wheels are pivotable for steering of the vehicle, the wheels preferably being mounted either on kingpins or another suitable type of pivotable mount. A conventional steering linkage (not shown) is provided between a steering wheel 30 and the front wheels. One suitable steering system for use in pivoting the front wheels of vehicle such as vehicle 10, including kingpins for the front wheels and linkages between the steering wheel and wheel pivots is shown in FIGS. 2–4 of U.S. Pat. No. 4,709,958. The disclosure of that patent is incorporated herein by this reference.

Turning now to the vehicle's drive system 12, it is to be noted that such system is powered by a conventional DC battery 14. Battery 14 thus serves as the power supply, or power source, for vehicle 10, providing energy to operate the drive motors, which in turn drive the vehicle's rear wheels. The battery develops a voltage, referred to as the battery voltage, between a pair of battery terminals 14a, 14b, the polarity of such voltage being determinative of the direction in which the wheels turn. Terminal 14a is designated herein as a positive terminal. Terminal 14b is designated as a negative terminal. The battery preferably is a solid-gel or starved electrolyte rechargeable battery with a nominal predetermined voltage of 12 or 18-volts DC. In the depicted embodiment, the battery is installed in the trunk of the vehicle, but similarly could be mounted in another location and covered by a housing which resembles, for example, an automotive engine.

As shown, battery 14 is coupled with shift mechanism 22 via the vehicle's wiring harness 24, and a simulated gas pedal 20. The drive motors similarly connect to the shift mechanism via the wiring harness, each motor including first and second electrical connection terminals to which the wiring harness may be applied. The shift mechanism thus is able to provide the rider with control over both direction and speed of the drive motors by defining an interconnecting circuit as will now be described.

Figure 6:
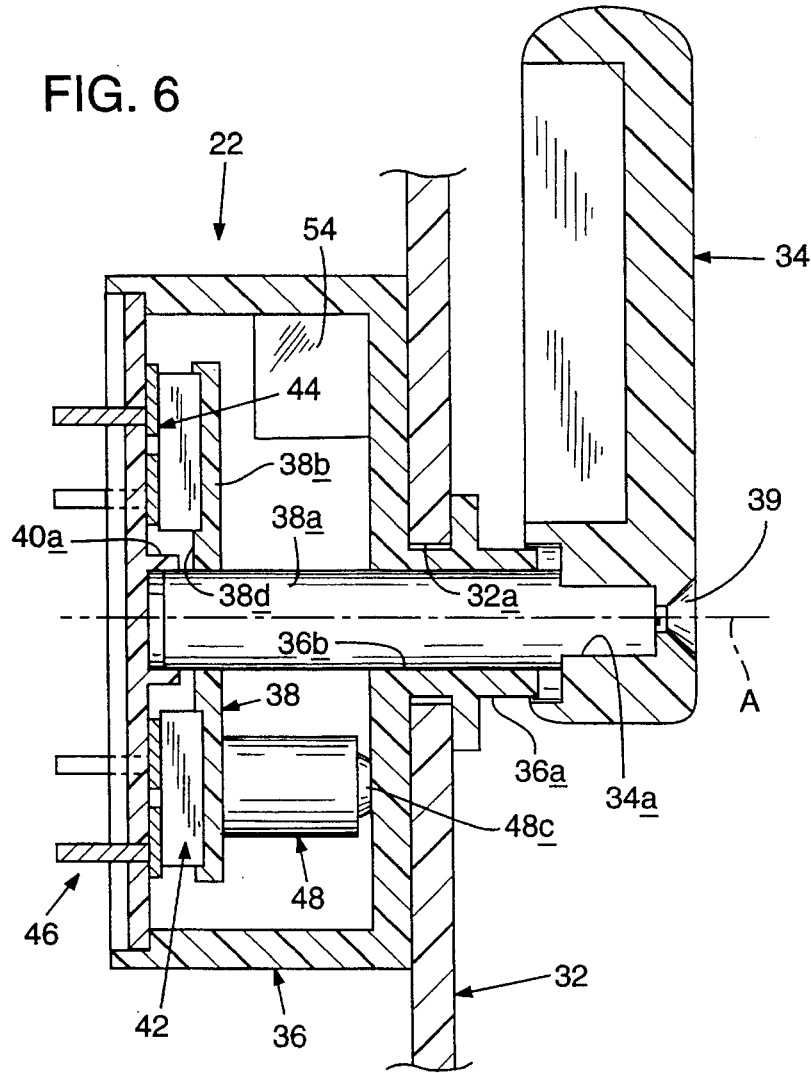
FIG. 6 is a sectional side view of the switch depicted in FIG. 2, illustrating the internal mechanism of the switch.

Referring now to FIGS. 2 and 6, the reader is provided with detailed illustrations of the vehicle's shift mechanism 22, such mechanism embodying the invented multi-position electrical switch. As indicated, the shift mechanism is configured for securement to the vehicle's chassis 32, the chassis preferably being provided with a keyed opening such as that shown at 32a. Shift mechanism 22 includes a manually operable control lever, or shift lever 34, and a housing 36 which in turn is provided with a keyed, hollow shaft 36a. Shaft 36a, it will be noted, is of similar size and shape to opening 32a, and is used in securing the shift mechanism to the vehicle's chassis (see FIG. 6). The shift lever 34 thus may be mounted on one side (the outside) of the vehicle's chassis, and the housing 36 may be mounted on the other side (the inside) of the vehicle's chassis, thus isolating occupants from the switch mechanism's electronics, and correspondingly protecting such occupants from electric shock.

In accordance with the present invention, housing 36 contains a rotatable selector mechanism 38, such mechanism being manually operable by coupling with shift lever 34. Toward this end, selector mechanism 38 is provided with an elongate control shaft 38a which, in turn, passes through corridor 36b of hollow shaft 36a. The control shaft 38a thus may be placed into a mating socket 34a in shift lever 34. As best indicated in FIG. 2, the control shaft and shift lever socket preferably are keyed so as to provide for coincident rotational movement of the selector mechanism and shift lever about an axis A. A fastener such as bolt 39 may be used to further secure the shift lever to the selector mechanism's control shaft.

Further in accordance with the invention, selector mechanism 38 will be seen to include a generally planar disc 38b which rotates in unison with shaft 38a. The disc defines a generally planar mounting surface 38d which extends in a plane substantially perpendicular to axis A. Mounted on the disc are a plurality of electrically conductive bridges 42 (indicated by dashed lines at 42a–42e in FIGS. 3–5), such bridges extending radially in predetermined regions of surface 38d. Four of the bridges (42a–42d) extend radially from control shaft 38a. The remaining bridge (42e) extends substantially across the disc. As indicated, the bridges generally are raised relative to surface 38d, but bridge 42e is raised only in segments adjacent the disc's perimeter for reasons which will become apparent upon reading further. The raised segments of bridge 42e are electrically connected to one another via a conductor imbedded in disc 38b as indicated by dashed lines in FIG. 2.

Referring still to FIGS. 2 and 6, it is to be noted that the switch further includes a base such as base plate 40 which, in turn, is configured for securement to the shift mechanism's housing 36. The base plate thus includes plural tabs 40c which mate with corresponding slots 36c in housing 36. Once applied to the housing, the base plate is stationary relative thereto, and thus is referred to herein as a stationary base plate.

As indicated, base plate 40 is provided with a tubular guide 40a which rotatively mounts the selector mechanism's control shaft 38a. The selector mechanism thus is configured to rotate relative to the stationary base plate.

Focusing now on base plate 40, it will be seen that such plate defines a generally planar surface 40b which faces surface 38d of selector mechanism 38. As indicated, surface 40b mounts a plurality of concentrically-arranged, electrically-conductive contacts 44 (44a–44f in FIGS. 3–5), each of which is independently electrically connected to a separate switch terminal such as that shown at 46. The switch terminals, in turn, are configured for subsequent electrical connection to corresponding terminals of the motors and power source via wiring harness 24.

Figure 5:
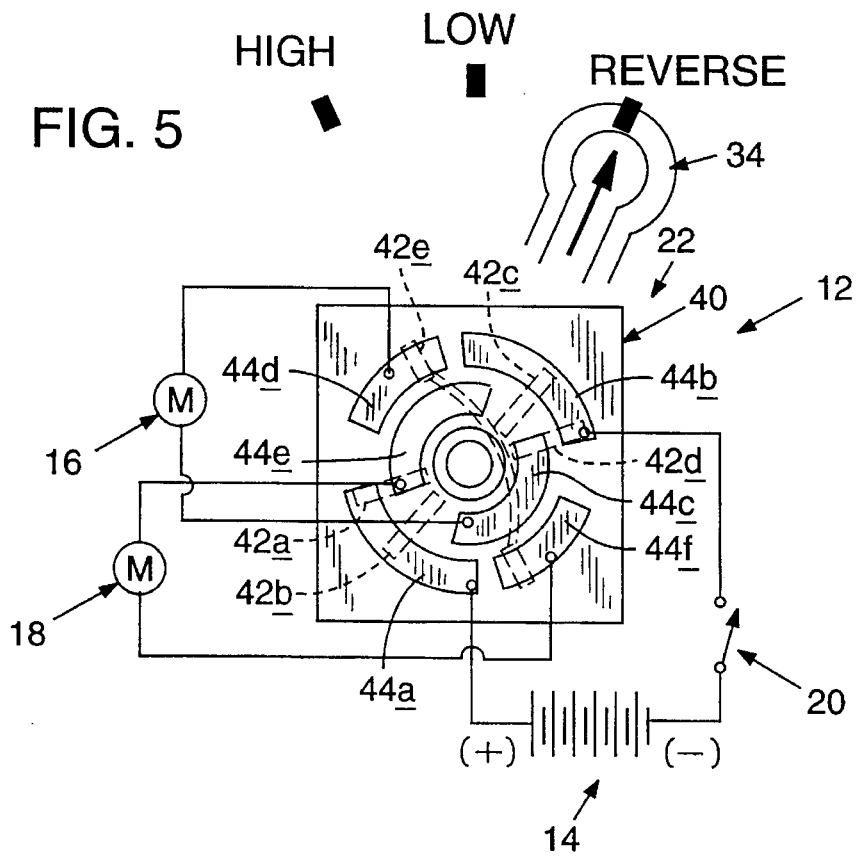
FIG. 5 is a schematic representation of a drive system similar to that of FIGS. 3 and 4, but with the switch configured so as to place the system in a low-speed reverse configuration.

Keeping with the invention, the contacts are arranged in predetermined inner and outer contact arrays, each array including contacts in the form of conductive strips which extend arcuately about central axis A. As indicated, the contacts are spaced apart, and thus are electrically isolated absent connection by bridges 42. The bridges, it will be appreciated, line up radially with the inner and outer contact arrays so as to connect selected contacts, and thereby to define the circuit between the motors and power source. Bridges 42a–42d, for example, are arranged to selectively connect inner and outer contacts, and bridge 42e is arranged to selectively connect opposite contacts of the outer contact array. Contacts 44 thus will be understood to extend in radially-spaced, circumferentially-overlapping arcuate regions as shown in FIGS. 3–5. Specifically, it will be noted that inner contact 44e circumferentially overlaps radially-spaced outer contacts 44a, 44d and 44b. Inner contact 44c similarly circumferentially overlaps radially-spaced outer contacts 44a, 44f and 44b.

Focusing on FIG. 6, it will be noted that the assembled switch mechanism places the bridges of selector mechanism 38 into engagement with the contacts of stationary base plate 40, the bridges spanning the distance between selected ones of such contacts to define electrical connections between the switch terminals, and thus between the terminals of the motors and power source. Upon rotation of shift lever 34, and consequent rotation of selector mechanism 38, bridges 42 will unitarily sweep across contacts 44 so as to selectively alter the circuit between the motors and power source. The contacts, and bridges thus are arranged such that various, predetermined circuit configurations may be provided by predetermined orientation of selector mechanism 38. Specifically, the selector mechanism is rotatable to move the bridges between a forward/parallel orientation wherein the bridges connect contacts 44 so as to configure the motors in parallel with the power source in a first polarity arrangement (FIG. 3), a forward/series orientation wherein the bridges connect the contacts so as to configure the motors in series with the power source in the first polarity arrangement (FIG. 4), and a reverse/series orientation wherein the bridges connect to the contacts so as to configure the motors in series with the power source in a second polarity arrangement opposite the first polarity arrangement (FIG. 5). The contacts are circumferentially spaced so as to momentarily disconnect the motors and power source as the bridges rotate between the selected orientations.

As indicated in FIGS. 2 and 6, selector mechanism 38 includes a latch member 48 which is configured to releasably hold the selector mechanism into each of three selected rotational positions. These positions correspond to the just-described bridge orientations, and thus to three distinct circuit configurations as will be described in detail below. Latch member 48 includes a spring guide 48a which houses a spring 48b and a ball 48c which is biased by the spring. Spring guide 48a is rigidly secured to the selector mechanism's bridge carriage, or disc 38b, and correspondingly moves therewith. Ball 48c is biased against an interior surface of housing 36 which, in turn, is provided with three detents such as that shown at 49 (FIG. 2). The detents are arranged so that the ball wild seat within one of the detents when the selector mechanism is in a corresponding rotational position, but is releasable upon manual operation of shift lever 34.

The selector mechanism also is provided with an upstanding stop member 50 which projects from bridge carriage 38b, and thus is maintained in housing 36. The stop member is configured so as to provide for selected engagement with similar projecting members 52, 54 which are mounted on the housing. Stop member 50 preferably will engage projecting members 52, 54 upon selected maximum rotations of the shift lever, and thus the selector mechanism, in either clockwise or counterclockwise directions. In this manner, the electrical configurations provided by rotation of the selector mechanism may be limited to the three configurations identified above. Correspondingly, the shift lever's rotation may be limited to more closely correlate to normal shift action in a vehicle.

Turning now to FIGS. 3–5, the reader will note that the vehicle's drive system has been shown schematically, each figure representing a different position of shift lever 34, and correspondingly a different circuit configuration of drive system 12. FIG. 3 shows the drive system in a high-speed forward configuration, FIG. 4 shows the drive system in a low-speed forward configuration, and FIG. 5 shows the drive system in a low-speed reverse configuration. The principal difference between these configurations will be understood to reside in the rotational position of the selector mechanism, and thus the orientation of bridges 44a–44e.

With respect first to the commonalities between the three circuit configurations, the reader will note that positive and negative terminals of battery 14 are connected to respective positive power contact 44a and negative power contact 44b of base plate 40. Motors 16 and 18 similarly connect to contacts on base plate 40, motor 16 being connected across load contacts 44c and 44d, and motor 18 being connected across load contacts 44e and 44f. The battery, it will be appreciated, is connected to the shift mechanism via simulated gas pedal 20 which acts as the vehicle's on-off switch.

Looking closely at the contact arrangement, it will be noted that the inner array includes first and second load contacts which are connected to respective first terminals of motors 16 and 18, and the outer array includes third and fourth load contacts connected to respective second terminals of motors 16 and 18. It will be appreciated that, although motors are illustrated herein as constituting electrical load elements, various other electrical loads could be employed. Similarly, although a DC battery is illustrated as constituting the power source, various other power sources may be employed.

As indicated above, FIG. 3 shows the drive system in a high-speed forward configuration, such configuration being indicated illustratively by the "HIGH" position of shift lever 34. In this configuration, the motors are placed in parallel with the power source in a first polarity arrangement. This is accomplished via the predetermined of electrically conductive bridges in combination with the arrangement of electrical contacts which are connected thereby. As indicated, bridge 42a connects contact 44a to contact 44c, bridge 42b connects contact 44c to contact 44f, bridge 42c connects contact 44d to contact 44e, and bridge 42d connects contact 44e to contact 44b. The remaining bridge 42e does not engage any of the contacts.

In FIG. 4, the drive system is shown in its low-speed forward configuration as indicated by the "LOW" position of shift lever 34. It is to be noted that the relative positions of the bridges has not changed from that shown in FIG. 3, the bridges being mounted on the selector mechanism for movement in unison therewith. In the low-speed forward configuration, bridge 42b connects contact 44a to contact 44c, bridge 42c connects contact 44e to contact 44b, and bridge 42e connects contact 44d to contact 44f. Bridge 42d and bridge 42a do not connect adjacent contacts, but rather engage only a single contact, and have no appreciable effect. It thus will be appreciated that the motors are placed in series across the power source in the first polarity arrangement. This drives the motors in a forward direction.

In FIG. 5, the vehicle's drive system is shown with the shift lever 34 pivoted to the "REVERSE" position, the drive system thus being placed in a low-speed reverse configuration. As indicated, such configuration results in a bridge orientation wherein bridge 42a connects contact 44a to contact 44e, bridge 42d connects contact 44c to contact 44b, and bridge 42e connects contact 44d to contact 44f. Bridge 42b engages only contact 44a and bridge 42c engages only contact 44b, and thus have no effect. The motors are thus placed in series across the power source in a second, reverse polarity arrangement so as to drive the motors in a reverse direction.

While the present invention has been shown and described with reference to the foregoing preferred embodiment, it will be apparent to those skilled in the art that other changes in form and detail may made without departing from the scope of the invention as defined in the appended claims.

I claim:

1. A multi-position electrical switch for use in a child's riding toy to connect a power source to a plurality of motors in selected alternative configurations, said switch comprising:

a base which includes a plurality of stationary contacts, each contact adapted to be independently electrically connected to a predetermined terminal of the motors and power source;

a manually operable selector mechanism mounted for movement relative to said base;

an arrangement of electrically conductive bridges which are mounted on said selector mechanism for unitary movement between a forward/parallel orientation wherein said bridges connect the stationary contacts so as to configure the motors in parallel with the power source in a first polarity arrangement, a forward/series orientation wherein said bridges connect the stationary contacts so as to configure the motors in series with the power source in said first polarity arrangement, and a reverse/series orientation wherein said bridges connect the stationary contacts so as to configure the motors in series with the power source in a second polarity arrangement opposite said first polarity arrangement; and wherein said contacts are spaced to automatically momentarily disconnect said power source and said motors as said bridges move between said orientations.

2. The electrical switch of claim 1, wherein said bridges sweep across said base.

3. The electrical switch of claim 1, wherein said selector mechanism includes a latch member capable of releasably locking said bridge arrangement into each of said orientations.

4. The electrical switch of claim 1, wherein said stationary contacts are arranged about an axis which extends through said base to define a plurality of concentric contact arrays.

5. The electrical switch of claim 4, wherein said bridge arrangement rotates about said axis upon operation of said selector mechanism.

6. The electrical switch of claim 5, wherein said selector mechanism includes a stop member which limits rotation of said bridge arrangement in each rotational direction.

7. A child's riding toy comprising:

a DC power source:

a pair of DC motors, each including first and second terminals; and a multi-position electrical switch comprising:

a base which includes six electrically conductive contacts arranged in inner and outer concentric arrays, said inner array including a first motor contact connected to a first terminal of one motor and a second motor contact connected to a first terminal of another motor, and said outer array including a third motor contact connected to a second terminal of the one motor, a fourth motor contact connected to a second terminal of the other motor, and positive and negative power source contacts connected to respective positive and negative terminals of the power source; and a manually rotatable selector mechanism mounted for rotational movement relative to said base, said selector mechanism carrying an arrangement of elongate, radially-extending, electrically conductive bridges which rotate in unison between: a forward/parallel orientation wherein said bridges connect said positive power contact to said first and fourth motor contacts, and connect said negative power contact to said second and third motor contacts; a forward/series orientation wherein said bridges connect said positive power contact to said first motor contact, connect said negative power contact to said second motor contact, and connect said third and fourth motor contacts together; and a reverse/series orientation wherein said bridges connect said negative power contact to said first motor contact, connect said positive power contact to said second motor contact, and connect said third and fourth motor contacts together, at least one of said bridges being adapted to connect radially-opposite contacts.

8. A multi-position electrical switch for use in variously connecting a DC power source to a pair of electrical load elements in selected alternative configurations, said switch comprising:

a base which includes a plurality of electrically conductive contacts, each taking the form of an elongate conductive strip and extending arcuately in radially-spaced, circumferentially-overlapping arcuate regions about a central axis, and wherein said strips are arranged to define concentric inner and outer arrays, said inner array including a first load contact adapted to be connected to a first terminal of one load element and a second load contact adapted to be connected to a first terminal of another load element, and said outer array including a third load contact adapted to be connected to a second terminal of the one load element, a fourth load contact adapted to be connected to a second terminal of the other load element, and positive and negative power source contacts adapted to be connected to respective positive and negative terminals of a power source, and wherein said first load contact circumferentially overlaps i) said positive power contact, ii) said negative power contact and iii) said fourth load contact, and said second load contact circumferentially overlaps i) said positive power source, ii) said negative power contact and iii) said third load contact; and an arrangement of elongate electrically conductive bridges which are mounted for unitary movement between: a forward/parallel orientation wherein said bridges connect said positive power contact to said first and fourth load contacts, and connect said negative power contact to said second and third load contacts; a forward/series orientation wherein said bridges connect said positive power contact to said first load contact, connect said negative power contact to said second load contact, and connect said third and fourth load contacts together; and a reverse/series orientation wherein said bridges connect said negative power contact to said first load contact, connect said positive power contact to said second load contact, and connect said third and fourth load contacts together.

9. The electrical switch of claim 8, wherein said bridges extend radially to provide electrical connection between predetermined contacts of said base.

10. The electrical switch of claim 9, wherein said bridges sweep across said base.

* * * * *